United States Patent [19]
Yagi et al.

[11] 3,843,618
[45] Oct. 22, 1974

[54] PROCESS FOR PRODUCING BUTADIENE POLYMER

[75] Inventors: Yoshiharu Yagi, Toyonaka; Hiroshi Sato, Takatsuki; Shizuo Narisawa; Seimei Yasui, both of Ibaragi; Akira Kobayashi, Nishinomiya; Minoru Hino; Kazuhiko Hata, both of Takatsuki, all of Japan

[73] Assignee: Sumitomo Chemical Company, Limited, Osaka-fu, Japan

[22] Filed: Dec. 27, 1971

[21] Appl. No.: 212,696

[52] U.S. Cl. .......................... 260/94.3, 252/431 C
[51] Int. Cl. .............................. C08d 1/14
[58] Field of Search .................... 260/94.3

[56] References Cited
UNITED STATES PATENTS

| | | | |
|---|---|---|---|
| 3,649,605 | 3/1972 | Throckmorton | 260/94.3 X |
| 3,681,315 | 8/1972 | Yagi et al. | 260/94.3 |
| 3,684,789 | 8/1972 | Yagi et al. | 260/94.3 |

*Primary Examiner*—Joseph L. Schofer
*Assistant Examiner*—W. F. Hamrock
*Attorney, Agent, or Firm*—Stewart and Kolasch Ltd.

[57] ABSTRACT

A process for producing butadiene polymer which comprises polymerizing 1,3-butadiene by using
1. a catalyst system comprising:
   A. at least one of nickel and cobalt compounds,
   B. a trialkylaluminum compound,
   C. a benzotrifluoride compound, and
   D. a hydroquinone compound
   in the presence of
   E. water together with at least one of alcohols, carboxylic acids and phenols; or
2. a catalyst system comprising:
   A. at least one of nickel and cobalt compounds,
   F. a dialkylaluminum monofluoride compound, and
   D. a hydroquinone compound
   in the presence or absence of
   G. water together with or without at least one of alcohols, carboxylic acids and phenols, to give a butadiene polymer containing predominantly cis-1,4-structure and having a regulated molecular weight.

12 Claims, No Drawings

PROCESS FOR PRODUCING BUTADIENE POLYMER

The present invention relates to a process for producing butadiene polymer. More particularly, it relates to a process for producing butadiene polymer containing predominantly cis-1,4-structure and having a regulated molecular weight by polymerization of 1,3-butadiene in the presence of a novel catalyst system.

For production of butadiene polymer of cis-1,4-structure, there have been known a variety of catalyst systems, of which typical examples are as follows: (1) a composition comprising a halogenated titanium compound and a trialkyl aluminum; (2) a composition comprising a halogenated cobalt compound and an alkyl aluminum halide and (3) a composition comprising a nickel or cobalt compound, a trialkylaluminum and a Lewis acid such as an inorganic halogenated compound or its derivative.

Among these catalyst systems, the ternary catalyst system (3) containing a nickel or cobalt compound has been highly evaluated due to its high catalytic activity and various advantages in its practical use.

As described in Belgian Pat. No. 750,514 and Dutch Pat. application No. 70/07183, the present inventors found previously that the polymerization of 1,3-butadiene in the presence of a catalyst system consisting essentially of (A) at least one of nickel and cobalt compounds, (B) a trialkyl aluminum compound, (C) a benzotrifluoride compound represented by the formula:

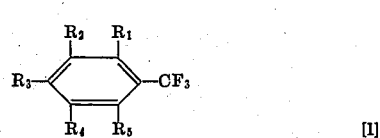

[I]

(wherein $R_1$, $R_2$, $R_3$, $R_4$ and $R_5$ are each a hydrogen atom, a halogen atom, an alkyl group or a fluoroalkyl group), and (D) a hydroquinone compound represented by the formula:

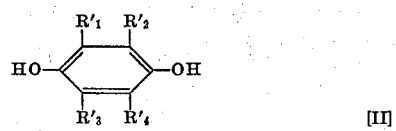

[II]

(wherein $R_1'$, $R_2'$, $R_3'$, and $R_4'$ are each a hydrogen atom or a halogen atom or the combination of $R_1'$ with $R_2'$ and/or of $R_3'$ with $R_4'$ is an aromatic condensed ring(s) and the remaining substituents are, if any, each a hydrogen atom or a halogen atom) can afford a butadiene polymer containing predominantly cis-1,4 structure.

In the above polymerization, the regulation of the molecular weight of the butadiene polymer can be accomplished by a per se conventional manner, i.e., controlling appropriately the composition, the preparation condition and the concentration of the catalyst system, the concentration of the monomer, the temperature of polymerization and the like. But, certain technical skills are required for such controls.

In order to overcome this drawback, the present inventors continued the study and found that the control of the water content in the polymerization reaction system makes it possible to regulate the molecular weight of the butadiene polymer with ease and that the existence of water in the polymerization reaction system results not in the decrease of the polymerization rate but in the increase of the same, compared with those in the absence of water.

As the results of the further study, it has now been found that the molecular weight of the butadiene polymer can be readily regulated by incorporation of a designed amount of a specific compound(s) in the catalyst system or in a novel catalyst system for producing butadiene polymer containing predominantly cis-1,4-structure.

In this specification, the term "alkyl" is preferred to be lower alkyl having 1 to 6 carbon atoms and the term "halogen" is intended to cover four kinds of halogen atoms, i.e., chlorine, bromine, iodine and fluorine.

According to the present invention, 1,3-butadiene is polymerized by using 1. a catalyst system comprising:
   A. at least one of nickel and cobalt compounds,
   B. a trialkyl aluminum compound,
   C. a benzotrifluoride compound represented by the formula:

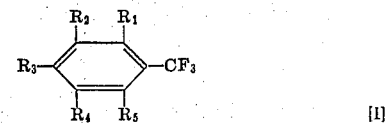

[I]

wherein $R_1$, $R_2$, $R_3$, $R_4$ and $R_5$ are each a hydrogen atom, a halogen atom, an alkyl group or a fluoroalkyl group, and D. a hydroquinone compound represented by the formula:

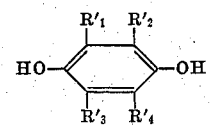

wherein $R_1'$, $R_2'$, $R_3'$ and $R_4'$ are each a hydrogen atom or a halogen atom, or the combination of $R_1'$ with $R_2'$ and/or of $R_3'$ with $R_4'$ is an aromatic condensed ring(s) and the remaining substituents are, if any, each a hydrogen atom or a halogen atom in the presence of
   E. water together with at least one of alcohols, carboxylic acids and phenols; or 2. a catalyst system comprising:
   A. at least one of nickel and cobalt compounds,
   F. a dialkylaluminum monofluoride compound, and
   D. a hydroquinone compound represented by the formula (II)

in the presence or absence of
   G. water together with or without at least one of alcohols, carboxylic acids and phenols, to give a butadiene polymer containing predominantly cis-1,4-structure and having a regulated molecular weight.

As the nickel and cobalt compounds, there may be employed the one(s) selected from various salts and organic complex compounds of nickel and cobalt such as nickel halides (e.g., nickel chloride), nickel sulfate, organic acid salts of nickel (e.g., nickel acetate, nickel naphthenate, nickel octanoate, nickel salts of organic sulfonic acids), complex compounds of nickel salts (e.g., nickel chloride-pyridine complex, tris(dipyridyl)-nickel chloride, bis(ethylenediamine)nickel sulfate), organic coordination compounds of nickel or nickel chelate compounds (e.g., bis-dimethylglyoxymato nickel, bis-ethylacetoacetate nickel, bis-acetylacetonate nickel) and their cobalt alternatives. The use of the nickel compounds is generally preferred.

Examples of the trialkyl aluminum compound include trimethyl aluminum, triethyl aluminum, tri-n-butyl aluminum, triisobutyl aluminum and tri-n-hexyl aluminum.

Examples of the benzotrifluoride compound (I) are benzotrifluoride, 2-chlorobenzotrifluoride, 3-chlorobenzotrifluoride, 4-chlorobenzotrifluoride, 2-bromobenzotrifluoride, 3-bromobenzotrifluoride, 4-bromobenzotrifluoride, 2,5-dichlorobenzotrifluoride, 3,4-dichlorobenzotrifluoride, 2,3-dibromobenzotrifluoride, 2,5-difluorobenzotrifluoride, 3,5-difluorobenzotrifluoride, 2-methylbenzotrifluoride, 3-methylbenzotrifluoride, 4-methylbenzotrifluoride, 2-hexylbenzotrifluoride, 4-hexylbenzotrifluoride, 2-dodecylbenzotrifluoride, 4-dodecylbenzotrifluoride, 2-monofluoromethylbenzotrifluoride, 3-difluoromethylbenzo trifluoride, 1,3-bis(trifluoromethyl)benzene, 3-(3'-fluoropropyl)benzotrifluoride, 4-(2',3'-difluoropropyl)benzotrifluoride, 1,3,5-tris(trifluoromethyl)benzene, 2-methyl-4-chlorobenzotrifluoride, 3-bromo-4-ethylbenzotrifluoride, 2-methyl-4-trifluoromethylbenzotrifluoride, 3-fluoro-4-trifluoromethylbenzotrifluoride, etc.

Examples of the hydroquinone compound (II) are tetrachlorohydroquinone, 2,3,5-trichlorohydroquinone, 2,5-dichlorohydroquinone, 2-chlorohydroquinone, tetrabromohydroquinone, 2,3,5-tribromohydroquinone, 2,5-dibromohydroquinone, 2-bromohydroquinone, tetraiodohydroquinone, 2,3,5-triiodohydroquinone, 2,5-diidohydroquinone, 2-iodohydroquinone, hydroquinone, 1,4-dihydroxynaphthalene, 1,4-dihydroxy-2,3-dichloronaphthalene, 9,10-dihydroxyanthracene, 1,4-dihydroxyanthracene, 1,4-dihydroxyphenanthrene, etc.

Examples of the dialkyl aluminum monofluoride are dimethyl aluminum monofluoride, diethylaluminum monofluoride, diisopropylaluminum monofluoride, di-n-butylaluminum monofluoride, diisobutylaluminum monofluoride, di-n-hexylaluminum monofluoride, etc.

As the alcohol, there may be employed saturated and unsaturated aliphatic alcohols, aromatic alcohols, alicyclic alcohols, halogenated alcohols, etc. Specific examples are methyl alcohol, ethyl alcohol, isopropyl alcohol, butyl alcohol, isobutyl alcohol, amyl alcohol, isoamyl alcohol, neopentyl alcohol, hexyl alcohol, isohexyl alcohol, heptyl alcohol, isoheptyl alcohol, octyl alcohol, isooctyl alcohol, nonyl alcohol, isononyl alcohol, decyl alcohol, isodecyl alcohol, dodecyl alcohol, myristyl alcohol, cetyl alcohol, stearyl alcohol, sec-butyl alcohol, t-butyl alcohol, secamyl alcohol, t-amyl alcohol, sec-hexyl alcohol, t-hexyl alcohol, ethylene glycol, propylene glycol, trimethylene glycol, tetramethylene glycol, glycerol, allyl alcohol, crotyl alcohol, oleyl alcohol, butene-2-diol, propargyl alcohol, benzyl alcohol, cyclohexyl alcohol, 2-chloroethyl alcohol, 2-bromoethyl alcohol, glycerol-2-monochlorohydrin, etc.

As the carboxylic acid, there may be used saturated and unsaturated aliphatic carboxylic acids, aromatic carboxylic acids, alicyclic carboxylic acids, halogenated carboxylic acids, and the like. Specific examples are acetic acid, propionic acid, valeric acid, isovaleric acid, butyric acid, isobutyric acid, capronic acid, heptanoic acid, caprylic acid, pelargonic acid, capric acid, undecanoic acid, lauric acid, myristic acid, palmitic acid, stearic acid, rhodinic acid, naphthenic acid, disproportionated rhodinic acid, 2-ethylhexylic acid, benzoic acid, hexahydrobenzoic acid, β-chloropropionic acid, 2,4-dichlorobenzoic acid, 2,5-dichlorobenzoic acid, etc.

Examples of the phenol are phenol, o-cresol, m-cresol, p-cresol, 2,3-xylenol, 2,4-xylenol, 3,5-xylenol, 3,4-xylenol, p-t-butylphenol, 2,6-dimethyl-4-t-butylphenol, 3-methyl-6-t-butylphenol, 2-methyl-4,6-di-t-butyllphenol, 2,4-t-butylphenol, 2,6-di-t-butylphenol, 2,6-di-t-butyl-4-methylphenol, α-naphtol, β-naphthol, anthranol, o-chlorophenol, m-chlorophenol, p-chlorophenol, p-bromophenol, o-bromophenol, m-bromophenol, 2,3-dichlorophenol, 2,4,6-trichlorophenol, 2,4,5-trichlorophenol, etc.

The dialkylaluminum monofluoride compound may be obtained by reacting the trialkylaluminum with a perfluoroalkyl-substituted aromatic compound at a temperature from about −20° to 150°C in the presence or absence of an inert organic solvent such as an aromatic hydrocarbon (e.g., benzene, toluene, xylene), an aliphatic hydrocarbon (e.g., hexane, heptane, benzin), an alicyclic hydrocarbon (e.g., cyclohexane, decalin) and a hydrogenated aromatic hydrocarbon (e.g., tetralin), and their fluorinated derivatives, under an environment substantially free from water and other inhibitive materials such as oxygen, carbon monoxide and carbon dioxide.

The perfluoroalkyl-substituted aromatic compound includes an aromatic hydrocarbon (e.g., benzene, naphthalene) bearing at least one perfluoroalkyl group of the formula: $-C_nF_{2n+1}$ wherein n is an integer of 1 to 4 and having or not any other non-reactive substituent on the aromatic ring. Particularly preferred are aromatic hydrocarbons bearing 1 to 3 trifluoromethyl groups such as benzotrifluoride, 2-chlorobenzotrifluoride, 3-chlorobenzotrifluoride, 4-chlorobenzotrifluoride, 2-bromobenzotrifluoride, 3-bromobenzotrifluoride, 4-bromobenzotrifluoride, 2,5-dichlorobenzotrifluoride, 3,4-dichlorobenzotrifluoride, 2,3-dibromobenzotrifluoride, 2,5-dibromobenzotrifluoride, 2,5-difluorobenzotrifluoride, 3,5-difluorobenzotrifluoride, 2-methylbenzotrifluoride, 3-methylbenzotrifluoride, 4-methylbenzotrifluoride, 2-hexylbenzotrifluoride, 2-dodecylbenzotrifluoride, 4-dodecylbenzotrifluoride, 2-monofluoromethylbenzotrifluoride, 3-difluoromethylbenzotrifluoride, 1,3-bis(trifluoromethyl)-benzene, 3-(3'-fluoropropyl)-benzotrifluoride, 4-(2',3'-difluoropropyl)-benzotrifluoride, 1,3,5-tris(trifluoromethyl)-benzene, 2-methyl-4-chlorobenzotrifluoride, 3-bromo-4-ethylbenzotrifluoride, 2-methyl-4-trifluoromethylbenzotrifluoride, 3-fluoro-4-trifluoromethylbenzotrifluoride, 2-trifluoromethyl-naphthalene, 1-trifluoromethylnaphthalene, 5,8-dichloro-1-trifluoromethylnapththalene, 1-trifluoromethyl-5-(3'-fluoropropyl)-naphthalene, etc. These may be used alone or in combination.

It is not always necessary to isolate the dialkylaluminum monofluoride from the reaction mixture of the trialkylaluminum with the perfluoroalkyl-substituted aromatic compound, and the reaction mixture may be used as such as one of the catalyst components.

The catalytic activity of the catalyst systems of the present invention is varied depending upon the mixing ratio of the components, the mixing order of the components, the concentration of each component, the temperature during the preparation of the catalyst system and the like. Of these, the mixing ratio of the components has particularly a great influence on the catalytic activity. The molar ratios of the nickel or cobalt compound to the trialkylaluminum compound or the dialkylaluminum monofluoride compound (i.e., (A)/(B) or (A)/(F)), the trialkylaluminum compound to the benzotrifluoride compound (i.e., (B)/(C)) and the nickel or cobalt compound to the hydroquinone compound (i.e., (A)/(D)) may vary in the range from 0.001 to 2 (preferably from 0.01 to 1), from 0.1 to 5.0 (preferably from 0.2 to 4.0) and from 0.01 to 100 (preferably from 0.1 to 10), respectively. The molar ratios of water and of the alcohol, the carboxylic acid and/or the phenol to the trialkylaluminum compound (i.e., (E)/(B)) are from 0.01 to 2 (preferably from 0.1 to 1.2) and from 0.01 to 0.5, respectively.

Further, the nickel or cobalt compound may be used in the amount of 0.001 to 2 mmol (preferably from 0.01 to 1 mmol), based on 1 mol of monomer 1,3-butadiene. When the amount of any one of the components (A), (B), (C), (D), (E) and (F) is too large or small, the catalytic activity of the resultant catalyst system is extremely lowered or almost lost. That is, the high catalytic activity can be surely obtained only when the said mixing ratio is employed.

The mixing of each of the components for preparation of the catalyst systems can be accomplished in any optional order and is ordinarily carried out in the presence of a diluent. For obtaining the catalyst systems with a higher activity, the nickel or cobalt compound and the trialkylaluminum compound or the dialkylaluminum monofluoride may be allowed to contact each other in the presence of a small amount of an aliphatic conjugated diene (e.g., 1,3-butadiene, isoprene, dimethylbutadiene). Such technique will prevent the formation of insoluble material during the preparation and can thus minimize the harmful influence caused by contamination with a small amount of impurity in the polymerization reaction system.

The preparation of the catalyst system is executed at a temperature from −80° to 100°C, preferably from −20° to 50°C. In order to obtain the catalyst system of an enhanced catalytic activity, it is favorable that, after all of the components are mixed completely, the resultant mixture is aged at a temperature from 0° to 100°C.

A typical example of the concrete procedures for preparation of the catalyst system (2) of the invention is as follows: admixing the dialkylaluminum monofluoride compound with a diluent, adding thereto a small amount of 1,3-butadiene, adding further the nickel or cobalt compound and the hydroquinone compound in this order or in the reversed order and finally aging the resulting mixture at an appropriate temperature. Another typical example is as follows: dissolving or suspending the nickel or cobalt compound and the hydroquinone compound in a diluent, adding a small amount of 1,3-butadiene thereto while ice-cooling, adding further the dialkylaluminum monofluoride compound thereto and finally aging the resultant mixture at an appropriate temperature.

For the purpose of regulating the molecular weight of the polymer to be produced, a designed amount of water or water and at least one of alcohols, carboxylic acids and phenols are incorporated into the catalyst system (2) or the polymerization system.

The molar ratio of water to the dialkylaluminum monofluoride (i.e., (G)/(F)) is 0.05 to 1.5 (preferably 0.1 to 1.2). In case that the alcohol, the carboxylic acid and/or the phenol are used together with water, their molar ratio to the dialkylaluminum monofluoride is 0.01 to 0.5.

The presentation of water, the alcohol, the carboxylic acid and/or the phenol to the polymerization reaction system may be effected by various manners. In one of such manners, they can be incorporated into the catalyst system (1) on its preparation. That is, a part or whole of the desired amount of them may be presented in any one or all of the nickel or cobalt compound, the trialkyl aluminum compound, the benzotrifluoride compound (I) and the hydroquinone compound (II), or their mixtures, respectively. A typical example of the incorporation procedure is as follows: admixing the trialkyl aluminum compound with the benzotrifluoride compound (I) in a diluent, heating the resultant mixture at an appropriate temperature and then cooling it to around ice freezing temperature, adding thereto the alcohol, the carboxylic acid and/or the phenol and a small amount of 1,3-butadiene, further adding the nickel or cobalt compound and a mixture of the hydroquinone compound (II) with water in the said order and finally aging the resulting mixture; or the last but one operation may be modified so as to add the hydroquinone compound (II) and a mixture of the nickel or cobalt compound with water in the said order. Another typical example of the incorporation procedure is as follows: dissolving or suspending the nickel or cobalt compound and the hydroquinone compound (II) in a diluent, adding a small amount of 1,3-butadiene thereto while cooling with an ice bath, adding further a previously prepared solution of the trialkyl aluminum compound with the benzotrifluoride compound (I) containing the alcohol, the carboxylic acid and/or the phenol and then water thereto and finally aging the resultant mixture at an appropriate temperature. A further typical example of the incorporation procedure is as follows: dissolving the alcohol, the carboxylic acid and/or the phenol, a small amount of 1,3-butadiene and the nickel or cobalt compound in a diluent, adding the resultant solution into a previously prepared solution of the trialkyl aluminum compound with the benzotrifluoride compound, further adding thereto water and the hydroquinone compound in this order and finally aging the resulting mixture at an appropriate temperature.

Alternatively, they may be incorporated by way of absorption into 1,3-butadiene as well as admixture with a diluent to be applied as the reaction medium for the polymerization or by adding it to a whole mixture of the catalyst system, 1,3-butadiene and a diluent prior to or during the polymerization.

The incorporation of water, the alcohol, the carboxylic acid and/or the phenol into the catalyst system (2) may be effected at any step during its preparation. That is, a part or whole of the desired amount of these compounds may be presented in any one or all of the nickel or cobalt compound, the dialkylaluminum monofluoride compound and the hydroquinone compound, or their mixtures. Alternatively, they may be incorporated into the polymerization reaction system by way of absorption into 1,3-butadiene as well as admixture with a diluent to be applied as the reaction medium for the polymerization or by adding it to a whole mixture of the catalyst system, 1,3-butadiene and a diluent prior to or during the polymerization.

By incorporation of the alcohol, the carboxylic acid and/or the phenol together with water, the formation of insoluble materials during the aging of the catalyst composition as occasionally seen under certain conditions, for example when the water content is too large, can be completely prevented. Thus, the catalyst system can be solubilized in the polymerization reaction system, which can realize the continuous production of the butadiene polymer.

The polymerization reaction is effected under the environment substantially free from any inhibitive material which is occasionally encountered with the generally accepted Ziegler-Natta type catalysts. In general, when a Ziegler-Natta type catalyst comprising an organoaluminum compound is employed, the polymerization reaction must be performed under the environment completely free from water, because the presence of water prevents the polymerization or retards the polymerization rate. On the contrary, in the polymerization using the catalyst system of the invention, the incorporation of water rather increases the polymerization rate in spite of the presence of the organoaluminum compound. Further, the molecular weight of the produced polymer can be regulated by varying the water content.

Examples of the solvent as the diluent for the catalyst system and/or as the reaction medium for the polymerization include aromatic hydrocarbons (e.g., benzene, toluene, xylene), aliphatic hydrocarbons (e.g., hexane, heptane, benzin), alicyclic hydrocarbons (e.g., cyclohexane, decalin), hydrogenated aromatic hydrocarbons (e.g., tetralin), etc.

The polymerization is carried out by contacting 1,3-butadiene with the catalyst system in a liquid medium at a temperature from −30° to 150°C, preferably from 0° to 100°C. The catalyst system and 1,3-butadiene may be supplied to the reaction system in an optional order in the presence or absence of the liquid medium.

The recovery of the produced polymer from the reaction mixture may be performed in a per se conventional manner. For instance, the reaction mixture is poured into a large amount of aqueous or alcoholic medium such as methanol, isopropanol, methanol-acetone or hot water, if necessary, with previous addition of an antioxidant (e.g., phenol-β-naphthylamine, 2,6-di-tert-butyl-p-cresol), and then the precipitate is collected and washed with methanol to obtain a substantially colorless rubber-like polymer.

The butadiene polymer produced by the present invention is a rubber-like solid or a highly viscous material. The analysis of the micro structure according to the infrared absorption method reveals the presence of cis-1,4 structure in most butadiene units.

Practical and presently preferred embodiments of the present invention are illustratively shown in the following Examples wherein the intrinsic viscosity of the polymer is measured in toluene solution at 30°C and the micro structure of the polymer is determined from the infrared absorption spectrum according to the Morero's method [D. Morero et al.,: Chim. e Ind., 41 758 (1959)].

EXAMPLE 1

In the following procedure, the whole operations leading to completion of the polymerization are effected in an argon stream. All of the starting materials reagents and the solvent are previously dehydrated and deoxygenated.

A solution of triethyl aluminum (4.0 mmol) in toluene (3.54 ml) and benzotrifluoride (0.37 ml; 3.0 mmol) are added to anhydrous toluene (13.3 ml), and the resultant mixture is heated at 100°C for 1 hour. After cooling to room temperature, liquefied butadiene (6.7 ml; 4.5 g) and a solution of nickel naphthenate (0.4 mmol) in toluene (1.58 ml) are added thereto. The resulting mixture is stirred at room temperature for 30 minutes, and toluene is added thereto to make 100 ml whereby a catalyst solution is obtained.

In a glass made reaction tube, a solution of an alcohol (0.08 mmol) in toluene (4 ml), hydrous toluene containing 445 ppm of water (in which the water content is determined precisely by the Karl-Fischer's method) (7.5 ml) and a solution of tetrachlorohydroquinone (0.04 mmol) in toluene (8 ml) are admitted, and the above prepared catalyst solution (10 ml) is added thereto. The resultant mixture is heated at 40°C for 15 minutes and, after cooling, anhydrous toluene (70 ml) is added thereto. After further cooling to −10°C, liquefied butadiene (30 ml; 22 g) is added thereto. The reaction tube is sealed, and the polymerization is carried out at 40°C for 3 hours. The reaction mixture is admixed with a solution of phenyl-β-naphthylamine in toluene, and the resulting mixture is poured into a solution of phenyl-β-naphthylamine in methanol. The precipitated rubber-like polymer is dried below 50°C in vacuo.

The yield and the physical properties of the produced polymer are shown in Table 1.

Table 1

| No. | Alcohol | | Polymerization product | | | | | |
|-----|---------|---|------------------------|---|---|---|---|---|
| | Kind | Molar ratio to nickel naphthenate | Yield | | [η] | Micro structure (%) | | |
| | | | (g) | (%) | (dl/g) | cis-1,4 | trans-1,4 | 1,2 |
| 1 | Isopropyl alcohol | 2.0 | 17.5 | 79.5 | 3.00 | 97.4 | 1.3 | 1.3 |
| 2 | n-Octyl alcohol | 2.0 | 16.6 | 75.5 | 3.63 | 97.5 | 1.3 | 1.2 |
| 3 | Lauryl alcohol | 2.0 | 13.9 | 63.2 | 3.55 | 97.5 | 1.3 | 1.2 |
| 4 | Stearyl alcohol | 2.0 | 15.9 | 72.3 | 3.41 | 97.4 | 1.3 | 1.3 |
| 5 | Allyl alcohol | 2.0 | 13.0 | 59.1 | 3.34 | 97.4 | 1.2 | 1.4 |
| 6 | Ethylene chlorohydrin | 2.0 | 15.1 | 68.6 | 3.00 | 97.3 | 1.3 | 1.4 |
| 7 | Benzyl alcohol | 2.0 | 16.7 | 75.9 | 2.94 | 97.3 | 1.3 | 1.4 |
| 8 | Not added*) | — | 19.3 | 87.7 | 2.34 | 97.3 | 1.3 | 1.4 |

*) : Insoluble materials are formed during the preparation of the catalyst system.

EXAMPLE 2

Triethyl aluminum (4.0 mmol) and benzotrifluoride (3.0 mmol) are heated in toluene as in Example 1, and the volume of the mixture is adjusted to 50 ml with anhydrous toluene. In a glass made reaction tube, the above prepared solution (5 ml) containing 0.4 mmol of triethyl aluminum is charged, and a solution of stearyl alcohol (0.04 to 0.08 mmol) in toluene (2 to 5 ml), a solution of 1,3-butadiene (0.23 g) in toluene (3 ml) and a solution of nickel naphthenate (0.04 mmol) in toluene (4 ml) are added thereto. The resultant mixture is heated at 25°C for 15 minutes. Then, hydrous toluene (3 to 6 ml) and a solution of tetrachlorohydroquinone (0.04 mmol) in toluene (8 ml) are added thereto, and the mixture is aged at 40°C for 15 minutes whereby a transparent, uniform catalyst solution is obtained. Anhydrous toluene is added thereto to make 100 ml, and the mixture is cooled to −10°C. Liquefied butadiene (22 g; 30 ml) is supplied therein and the reaction tube is sealed. The polymerization is carried out at 40°C for 3 hours. The reaction mixture is treated as in Example 1.

The results are shown in Table 2.

EXAMPLE 4

The preparation of a catalyst composition and the polymerization of 1,3-butadiene by the use of the obtained catalyst composition are executed in the same manner as in Example 1 except that a carboxylic acid is used in place of the alcohol.

The results are shown in Table 4.

Table 4

| No. | Carboxylic acid | | Polymerization product | | | | | |
|---|---|---|---|---|---|---|---|---|
| | Kind | Molar ratio to nickel naphthenate | Yield | | [η] | Micro structure | | |
| | | | (g) | (%) | (dl/g) | cis-1,4 | trans-1,4 | 1,2 |
| 1 | Acetic acid | 2.0 | 13.7 | 62.3 | 3.10 | 97.2 | 1.5 | 1.3 |
| 2 | 2-Ethylhexanoic acid | 2.0 | 6.5 | 29.5 | 3.66 | 97.3 | 1.5 | 1.2 |
| 3 | Benzoic acid | 2.0 | 14.8 | 67.3 | 2.78 | 97.2 | 1.5 | 1.3 |
| 4 | Not added | — | 17.3 | 78.6 | 2.34 | 97.3 | 1.4 | 1.3 |

EXAMPLE 5

In a 170 ml volume reactor equipped with a stirrer, there are supplied at 30°C a toluene solution containing nickel naphthenate (7.16 mmol/l) and 1,3-butadiene (237 mmol/l) and a toluene solution containing triethyl aluminum (30.1 mmol/l), benzotrifluoride (22.58 mmol/l), stearyl alcohol (7.53 mmol/l) and 1,3-butadiene (100 mmol/l) which is prepared by heating triethyl aluminum and benzotrifluoride in toluene at 100°C and adding thereto stearyl alcohol and 1,3-butadiene at the rates of 1.43 ml/hr and 340 ml/hr respectively. The discharged reaction mixture is introduced into a 64 ml volume reactor equipped with a stirrer, and moistened toluene containing 495 ppm of water is charged therein at a rate of 189 ml/hr at 30°C. The discharged reaction mixture is then introduced into a 75 ml volume reactor equipped with a stirrer, and a toluene solution containing tetrachlorohydroquinone (5.0 mmol/l) and 1,3-butadiene (165 mmol/l) is charged therein at a rate of 205 ml/hr at 40°C. The fi- Table 2

| No. | Molar ratio of stearyl alcohol to nickel naphthenate | Molar ratio of water to nickel naphthenate | Polymerization product | | | | | |
|---|---|---|---|---|---|---|---|---|
| | | | Yield | | [η] | Micro structure | | |
| | | | (g) | (%) | (dl/g) | cis-1,4 | trans-1,4 | 1,2 |
| 1 | 1.5 | 2.0 | 11.2 | 50.9 | 2.45 | 97.3 | 1.4 | 1.3 |
| 2 | 2.0 | 2.0 | 18.1 | 82.3 | 2.63 | 97.2 | 1.4 | 1.4 |
| 3 | 2.5 | 2.0 | 16.6 | 75.5 | 3.10 | 97.3 | 1.4 | 1.3 |
| 4 | 1.0 | 3.0 | 18.3 | 83.2 | 2.84 | 97.2 | 1.4 | 1.4 |
| 5 | 1.5 | 3.0 | 17.5 | 79.5 | 3.08 | 97.3 | 1.4 | 1.3 |
| 6 | 2.0 | 3.0 | 17.0 | 77.3 | 3.17 | 97.4 | 1.4 | 1.2 |
| 7 | 1.0 | 4.0 | 16.5 | 75.0 | 2.92 | 97.3 | 1.4 | 1.3 |
| 8 | 1.5 | 4.0 | 17.5 | 79.5 | 3.19 | 97.3 | 1.5 | 1.2 |
| 9 | 2.0 | 4.0 | 17.4 | 79.1 | 3.38 | 97.4 | 1.4 | 1.2 |

EXAMPLE 3

The preparation of a catalyst composition and the polymerization of 1,3-butadiene by the use of the obtained catalyst composition are executed in the same manner as in Example 1 except that a phenol is used in place of the alcohol.

The results are shown in Table 3.

Table 3

| No. | Phenol | | Polymerization product | | | | | |
|---|---|---|---|---|---|---|---|---|
| | Kind | Molar ratio to nickel naphthenate | Yield | | [η] | Micro structure | | |
| | | | (g) | (%) | (dl/g) | cis-1,4 | trans-1,4 | 1,2 |
| 1 | Phenol | 2.0 | 16.8 | 76.4 | 2.85 | 97.4 | 1.4 | 1.2 |
| 2 | o-Chlorophenol | 2.0 | 18.3 | 83.2 | 1.73 | 97.3 | 1.4 | 1.3 |
| 3 | p-Chlorophenol | 2.0 | 17.4 | 79.1 | 2.16 | 97.2 | 1.4 | 1.4 |
| 4 | 2,4-Dichlorophenol | 2.0 | 18.3 | 83.2 | 1.46 | 97.2 | 1.4 | 1.4 |
| 5 | 2,4,5-Trichlorophenol | 2.0 | 18.5 | 84.1 | 1.50 | 97.2 | 1.4 | 1.4 |
| 6 | 2,6-Di-t-butyl-4-methylphenol | 2.0 | 18.7 | 85.0 | 2.19 | 97.2 | 1.4 | 1.4 |
| 7 | β-Naphthol | 2.0 | 16.4 | 80.4 | 2.62 | 97.3 | 1.4 | 1.3 |
| 8 | Not added | — | 18.5 | 84.1 | 2.40 | 97.3 | 1.4 | 1.3 | nally obtained mixture is a transparent solution whose theoretical nickel content is 1.167 mmol/l. After continuation of the preparation procedures for 6 hours, the gel formation is not observed at all.

When stearyl alcohol is not used in the above procedures, a large amount of gel substances are formed sticking to the inner wall of the third reactor, and the continuous preparation procedures can not be executed for a long duration.

In a 1 liter volume reactor equipped with a stirrer, 1,3-butadiene (110 g) and toluene (480 ml) are charged, and the above obtained catalyst solution (170 ml) is added thereto while cooling. The reactor is sealed, and the polymerization is carried out at 40°C for 3 hours. The reaction mixture is, after being admixed with a toluene solution of 2,6-di-t-butyl-p-cresol and isopropoanol, poured into a large amount of methanol. The precipitated product is collected and dried in vacuo to give the butadiene polymer (79.5 g). Yield, 72 percent. $[\eta]$, 2.97. Mooney viscosity (100°C, $ML_{1+4}$), 47. Micro structure: cis-1,4, 97.3 percent; trans-1,4, 1.4 percent; vinyl, 1.3 percent.

EXAMPLE 6

In a glass made reaction tube, a solution of diethylaluminum monofluoride (4 mmol) in toluene (20 ml) is charged, and a solution of 1,3-butadiene (2.4 g) in toluene (74 ml) and a solution of nickel naphthenate (0.4 mmol) in toluene (6 ml) are added thereto in this order. The resulting mixture is stirred at 25°C for 30 minutes. A part of the mixture (10 ml) is taken out and charged into a 200 ml volume glass made pressure polymerization tube. Moistened toluene containing 417 ppm of water and a solution of tetrachlorohydroquinone (0.04 mmol) in toluene (8 ml) are added thereto in this order, and the resultant mixture is aged at 40°C for 15 minutes. Toluene is added thereto to make 130 ml. After the mixture is cooled below −20°C, 1,3-butadiene (22 g) is added, and the polymerization tube is sealed. In the foregoing procedure, the whole operations are effected in an argon stream. The polymerization tube is placed into a rotary constant temperature bath of 40°C, and polymerization is executed for a designed time. Then, the reaction mixture is poured into methanol containing a small amount of 2,6-di-t-butyl-p-cresol to cease the polymerization whereby the polymer is precipitated. The polymer is separated and dried at room temperature in vacuo.

The yield and the physical properties of the produced polymer are shown in Table 5.

Table 5

| No. | Molar ratio of water to diethyl aluminum monofluoride | Polymerization time (min.) | Polymerization product | | | | |
|---|---|---|---|---|---|---|---|
| | | | Yield (%) | $[\eta]$ (dl/g) | Micro structure | | |
| | | | | | cis-1,4 | trans-1,4 | 1,2 |
| 1 | 0.7 | 180 | 81.3 | 2.87 | 96.1 | 1.7 | 2.2 |
| 2 | 0.2 | 180 | 58.1 | 2.26 | 96.2 | 1.7 | 2.3 |

EXAMPLE 7

The preparation of a catalyst composition is executed in the same manner as in Example 6 except that the amounts of nickel naphthenate and diethylaluminum monofluoride are changed respectively to 0.02 mmol and 0.2 mmol and the total volume of the catalyst solution is adjusted to 20 ml. Then, the polymerization is carried out as in Example 6 but using 44 g of 1,3-butadiene at 25°C for 2 hours.

The results are shown in Table 6.

Table 6

| No. | Molar ratio of tetrachlorohydroquinone to nickel naphthenate | Molar ratio of water to diethyl aluminum monofluoride | Polymerization product | | | | |
|---|---|---|---|---|---|---|---|
| | | | Yield (%) | $[\eta]$ (dl/g) | Micro structure | | |
| | | | | | cis-1,4 | trans-1,4 | 1,2 |
| 1 | 5 | 0 | 77.5 | 3.04 | 96.3 | 1.6 | 2.1 |
| 2 | 1 | 0.6 | 44.6 | 3.82 | 96.4 | 1.6 | 2.0 |

EXAMPLE 8

The preparation of a catalyst composition is executed in the same manner as in Example 6 except that the amounts of nickel naphthenate and diethylaluminum monofluoride are changed respectively to 0.05 mmol and 0.5 mmol and the total volume of the catalyst solution is adjusted to 50 ml. Then, the polymerization is carried out as in Example 6 but using 10.2 g of 1,3-butadiene in a 100 ml volume polymerization tube.

The results are shown in Table 7.

Table 7

| No. | Component (D) | | Molar ratio of water to diethyl aluminum monofluoride | Polymerization time (min.) | Polymerization product | | | | |
|---|---|---|---|---|---|---|---|---|---|
| | Kind | Molar ratio to nickel naphthenate | | | Yield (%) | $[\eta]$ (dl/g) | Micro structure | | |
| | | | | | | | cis-1,4 | trans-1,4 | 1,2 |
| 1 | Tetrachlorohydroquinone | 10 | 0 | 300 | 83.6 | 1.03 | 95.7 | 1.7 | 2.6 |
| 2 | Tetrabromohydroquinone | 5 | 0.8 | 180 | 82.7 | 2.43 | 94.3 | 2.3 | 3.4 |

EXAMPLE 9

In the following procedure, the whole operations leading to completion of the polymerization are effected in an argon stream. All of the starting materials, the reagents and the solvent are previously dehydrated and deoxygenated.

In a glass made reaction tube, a solution of diethyl aluminum monofluoride (4 mmol) in toluene (20 ml) is charged, and a solution of 1,3-butadiene (2.43 g) in toluene (10 ml) and a solution of nickel naphthenate (0.4 mmol) in toluene (4ml) are added thereto in this order. The resultant mixture is stirred at room temperature for 30 minutes, and then toluene is added thereto to make 100 ml.

In a 200 ml volume glass made pressure polymerization tube, a solution of the alcohol (0.08 mmol) in toluene (4 ml), hydrous toluene (7.5 ml) containing 445 ppm of water (in which the water content is determined precisely by the Karl-Fischer's method) and a solution of tetrachlorohydroquinone (0.04 mmol) in toluene (8 ml) are admitted, and the above prepared catalyst solution (10 ml) is added thereto. The resultant mixture is heated at 40°C for 15 minutes, and after cooling, anhydrous toluene (70 ml) is added thereto. After further cooling it to −10°C, liquefied butadiene (30 ml; 22 g) is added thereto. The polymerization tube is sealed, and the polymerization is carried out at 40°C for 3 hours. The reaction mixture is admixed with a solution of phenyl-β-naphthylamine in toluene, and the resulting mixture is poured into a solution of phenyl-β-naphthylamine in methanol. The precipitated rubber-like polymer is dried below 50°C in vacuo.

The yield and the physical properties of the produced polymer are shown in Table 8.

toluene (5 ml) is charged, and a solution of stearyl alcohol (0.04 to 0.08 mmol) in toluene (2 to 5 mml), a solution of 1,3-butadiene (0.23 g) in toluene (3 ml) and a solution of nickel naphthenate (0.04 mmol) in toluene (4 ml) are added thereto in this order. The resultant mixture is heated at 25°C for 15 minutes. After addition of moistened toluene (3 to 6 ml) and a solution of tetrachlorohydroquinone (0.04 mmol) in toluene (8 ml), the mixture is aged at 40°C for 15 minutes whereby a transparent, uniform catalyst solution is obtained. Anhydrous toluene is added thereto to make 100 ml, and the mixture is cooled to −10°C. Liquefied butadiene (22 g; 30 ml) is supplied therein and the polymerization tube is sealed. The polymerization is carried out at 40°C for 3 hours. The reaction mixture is treated as in Example 9.

The results are shown in Table 9.

Table 9

| No. | Molar ratio of stearyl alcohol to nickel naphthenate | Molar ratio of water to diethyl aluminum monofluoride | Polymerization product | | | | |
|---|---|---|---|---|---|---|---|
| | | | Yield (%) | [η] (dl/g) | Micro structure | | |
| | | | | | cis-1,4 | trans-1,4 | 1,2 |
| 1 | 1.5 | 0.2 | 65.9 | 3.41 | 97.1 | 1.5 | 1.4 |
| 2 | 2.0 | 0.2 | 64.8 | 3.52 | 97.3 | 1.3 | 1.4 |
| 3 | 2.5 | 0.2 | 57.5 | 3.78 | 97.5 | 1.1 | 1.4 |
| 4 | 1.0 | 0.3 | 73.2 | 3.43 | 97.2 | 1.3 | 1.5 |
| 5 | 1.5 | 0.3 | 70.8 | 3.67 | 97.0 | 1.5 | 1.5 |
| 6 | 2.0 | 0.3 | 70.1 | 3.82 | 97.3 | 1.4 | 1.3 |
| 7 | 1.0 | 0.4 | 68.5 | 3.62 | 97.2 | 1.4 | 1.4 |
| 8 | 1.5 | 0.4 | 62.8 | 3.85 | 97.4 | 1.3 | 1.3 |
| 9 | 2.0 | 0.4 | 55.1 | 4.13 | 97.3 | 1.4 | 1.3 |

EXAMPLE 11

The preparation of a catalyst composition and the polymerization of 1,3-butadiene by the use of the obtained catalyst composition are executed in the same manner as in Example 9 except that the phenol is used in place of the alcohol.

The results are shown in Table 10.

Table 10

| No. | Phenol | | Polymerization product | | | | |
|---|---|---|---|---|---|---|---|
| | Kind | Molar ratio to nickel naphthenate | Yield (%) | [η] (dl/g) | Micro structure | | |
| | | | | | cis-1,4 | trans-1,4 | 1,2 |
| 1 | Phenol | 2.0 | 53.5 | 3.53 | 97.1 | 1.5 | 1.4 |
| 2 | p-Chlorophenol | 2.0 | 63.2 | 2.92 | 97.3 | 1.3 | 1.4 |
| 3 | 2,4,5-Trichlorophenol | 2.0 | 63.8 | 2.23 | 97.2 | 1.3 | 1.5 |
| 4 | 2,6-Di-t-butyl-4-methylphenol | 2.0 | 70.1 | 2.82 | 97.4 | 1.2 | 1.4 |
| 5 | β-Naphthol | 2.0 | 6.10 | 3.01 | 97.0 | 1.5 | 1.5 |
| 6 | Not added | — | 60.2 | 3.08 | 97.3 | 1.4 | 1.3 |

Table 8

| No. | Alcohol | | Polymerization product | | | | |
|---|---|---|---|---|---|---|---|
| | Kind | Molar ratio to nickel napthenate | Yield (%) | [η] (dl/g) | Micro structure | | |
| | | | | | cis-1,4 | trans-1,4 | 1,2 |
| 1 | Isopropyl alcohol | 2.0 | 60.5 | 3.48 | 96.8 | 1.5 | 1.7 |
| 2 | n-Octyl alcohol | 2.0 | 57.3 | 3.69 | 97.3 | 1.5 | 1.2 |
| 3 | Allyl alcohol | 2.0 | 48.5 | 4.08 | 96.9 | 1.5 | 1.6 |
| 4 | Ethylene chlorohydrin | 2.0 | 53.5 | 3.70 | 97.4 | 1.3 | 1.3 |
| 5 | Benzyl alcohol | 2.0 | 62.1 | 3.41 | 97.2 | 1.4 | 1.4 |
| 6 | Not added *) | — | 63.5 | 2.93 | 97.3 | 1.3 | 1.4 |

*) : Insoluble materials are formed during the preparation of the catalyst system.

EXAMPLE 10

In a glass made pressure polymerization tube, a solution of diethyl aluminum monofluoride (0.4 mmol) in

EXAMPLE 12

The preparation of a catalyst composition and the polymerization of 1,3-butadiene by the use of the obtained catalyst composition are executed in the same manner as in Example 9 except that the carboxylic acid is used in place of the alcohol.

The results are shown in Table 11.

Table 11

| No. | Carboxylic acid | | Polymerization product | | | | |
|---|---|---|---|---|---|---|---|
| | Kind | Molar ratio to nickel naphthenate | Yield (%) | $[\eta]$ (dl/g) | Micro structure | | |
| | | | | | cis-1,4 | trans-1,4 | 1,2 |
| 1 | Acetic acid | 2.0 | 45.8 | 3.41 | 96.8 | 1.5 | 1.7 |
| 2 | 2-Ethylhexylic acid | 2.0 | 38.3 | 3.84 | 97.2 | 1.6 | 1.2 |
| 3 | Benzoic acid | 3.0 | 51.5 | 3.23 | 97.2 | 1.3 | 1.5 |
| 4 | Not added | — | 58.2 | 2.92 | 97.3 | 1.2 | 1.5 |

EXAMPLE 13

In a 300 ml volume three-necked flask, a solution of triethyl aluminum purified with vacuum distillation (B.P., 75 to 78°C/5.0 mmHg; 100 mmol) in toluene (91.5 ml; the concentration of triethyl aluminum, 1.095 mmol/ml) is charged in an nitrogen stream, and benzotrifluoride purified by distillation (B.P., 103.5°C/760 mmHg; 12.3 ml; 100 mmol) is added thereto. The resultant mixture is stirred at 80°C for 1 hour. After cooling to room temperature, the reaction mixture is subjected to fractional distillation. As the first fraction of distillate (B.P., 110°C/760 mmHg), toluene (85 ml) containing unreacted benzotrifluoride (67 mmol) is obtained. The second fraction (B.P., 45 to 70°C/2 mmHg) is a colorless, transparent liquid (5.4 ml) containing unreacted triethyl aluminum (11.0 mmol) and diethyl aluminum monofluoride (4.0 mmol). The third fraction (B.P., 95 to 120°C/2 mmHg) is a colorless, transparent liquid (6.0 ml) of high viscosity, which consists of substantially pure diethyl aluminum monofluoride. The residue of distillate is a colorless, transparent solid (0.7 g), which is supposed to be a mixture of diethyl aluminum monofluoride and monoethyl aluminum difluoride. The total yield of diethyl aluminum monofluoride in the second and third fractions is 77.6 percent on the basis of the starting triethyl aluminum.

EXAMPLES 14 TO 17

The reaction is carried out as in Example 13 but using any substituted benzotrifluoride in place of benzotrifluoride. The distillation of the reaction mixture is effected in the same manner as in Example 13.

The results are shown in Table 12.

What is claimed is:

1. A process for producing butadiene polymer which comprises polymerizing 1,3-butadiene in the presence of a catalyst system comprising:

A. at least one nickel compound selected from the group consisting of the halides, sulfates, organic acid salts, complex compounds, organic coordination compounds and chelate compounds thereof,
   F. a dialkylaluminum monofluoride compound, and
   D. a hydroquinone compound having the formula:

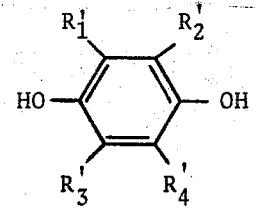

where $R_1'$, $R_2'$, $R_3'$ and $R_4'$ are each a hydrogen atom or a halogen atom, or the combination of $R_1'$ with $R_2'$ and/or of $R_3'$ with $R_4'$ is an aromatic condensed ring(s) and the remaining substituents, if any, are each a hydrogen atom or a halogen atom, in the presence or absence of
   G. water together with or without at least one alcohol, carboxylic acid or phenol to give a butadiene polymer containing predominantly a cis-1,4-structure and having a regulated molecular weight.

2. The process according to claim 1, wherein the molar ratios of the nickel compound to the dialkylaluminum monofluoride compound and the nickel compound to the hydroquinone compound are from 0.001 to 2 and from 0.01 to 100, respectively.

3. The process according to claim 1, wherein the molar ratios of the nickel compound to the dialkylalu- Table 12

| Example No. | Substituted benzotrifluoride Chemical name | Molar ratio to triethyl aluminum | Third fraction | | Al (mg-atom) | F (mg-atom) | Yield (%)* |
|---|---|---|---|---|---|---|---|
| | | | Pressure mmHg) | Distillation temp. (°C) | | | |
| 14 | 2-Chlorobenzotrifluoride | 1.0 | 2.0 | 95–123 | 70.3 | 70.0 | 70.2 |
| 15 | 2-Bromobenzotrifluoride | 1.0 | 2.0 | 95–120 | 68.2 | 67.5 | 68.0 |
| 16 | 2,4-Dichlorobenzotrifluoride | 1.0 | 2.0 | 92–118 | 70.5 | 70.3 | 70.3 |
| 17 | 3-Trifluoromethylbenzotrifluoride | 1.0 | 2.0 | 93–120 | 76.3 | 75.2 | 75.5 |

Note: *) calculated for diethyl aluminum monofluoride included only in the third fraction.

minum monofluoride compound and the nickel compound to the hydroquinone compound are from 0.01 to 1 and from 0.1 to 10, respectively.

4. The process according to claim 1, wherein the nickel compound is an organic acid salt selected from the group consisting of nickel acetate, naphthenate, octanoate and sulfonate.

5. The process according to claim 1, wherein the nickel compound is a complex compound, organic coordination compound or chelate compound selected from the group consisting of nickel chloride-pyridine complex, tris(dipyridyl) nickel chloride, bis(ethylenediamine) nickel sulfate, bis-dimethylglyoxymato nickel, bis-ethylacetoacetate nickel and bis-acetylacetonate nickel.

6. The process according to claim 1, wherein the dialkylaluminum monofluoride compound is selected from the group consisting of dimethylaluminum monofluoride, diethylaluminum monofluoride, diisopropylaluminum monofluoride, di-n-butylaluminum monofluoride, diisobutylaluminum monofluoride and di-n-hexylaluminum monofluoride.

7. The process according to claim 1, wherein the hydroquinone compound is selected from the group consisting of tetrachlorohydroquinone, 2,3,5-trichlorohydroquinone, 2,5-dichlorohydroquinone, 2-chlorohydroquinone, tetrabromohydroquinone, 2,3,5-tribromohydroquinone, 2,5-dibromohydroquinone, 2-bromohydroquinone, tetraiodohydroquinone, 2,3,5-triiodohydroquinone, 2,5-diiodohydroquinone, 2-iodohydroquinone, hydroquinone, 1,4-dihydroxynaphthalene, 1,4-dihydroxy-2,3-dichloronaphthalene, 9,10-dihydroxyanthracene, 1,4-dihydroxyanthracene and 1,4-dihydroxyphenanthrene.

8. The process according to claim 1, wherein the molar ratio of water to the dialkylaluminum monofluoride is from 0.05 to 1.5.

9. The process according to claim 1, wherein the molar ratio of the alcohol, the carboxylic acid and/or the phenol used together with water to the dialkylaluminum monofluoride is 0.01 to 0.5.

10. The process according to claim 1, wherein the nickel compound is used in an amount of 0.001 to 2 mmol based on 1 mol of monomeric 1,3-butadiene.

11. The process according to claim 1, wherein the polymerization is carried out in a liquid medium at a temperature from −30° to 150°C.

12. The process according to claim 1, wherein the dialkylaluminum monofluoride compound is obtained by reacting a trialkylaluminum compound with a perfluoroalkyl-substituted aromatic compound at a temperature from about −20° to 150°C in the presence or absence of an inert organic solvent.

* * * * *